United States Patent
Ishihara

(10) Patent No.: US 10,297,229 B2
(45) Date of Patent: May 21, 2019

(54) DISPLAY DEVICE AND CONTROL METHOD THEREFOR

(71) Applicant: Sharp Kabushiki Kaisha, Sakai, Osaka (JP)

(72) Inventor: Tomoyuki Ishihara, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 5 days.

(21) Appl. No.: 15/539,659

(22) PCT Filed: Oct. 20, 2015

(86) PCT No.: PCT/JP2015/079508
§ 371 (c)(1),
(2) Date: Jun. 23, 2017

(87) PCT Pub. No.: WO2016/103871
PCT Pub. Date: Jun. 30, 2016

(65) Prior Publication Data
US 2017/0365233 A1   Dec. 21, 2017

(30) Foreign Application Priority Data
Dec. 25, 2014 (JP) .................. 2014-262207

(51) Int. Cl.
*G09G 5/10* (2006.01)
*G09F 9/00* (2006.01)
(Continued)

(52) U.S. Cl.
CPC ............... *G09G 5/10* (2013.01); *A47F 11/06* (2013.01); *G02F 1/1335* (2013.01); *G09F 9/00* (2013.01);
(Continued)

(58) Field of Classification Search
CPC ....... G09G 5/10; H04N 13/279; H04N 13/366
(Continued)

(56) References Cited

U.S. PATENT DOCUMENTS 8,545,305 B2 * 10/2013 Ross ................... G07F 17/3202
345/102
2013/0217487 A1 * 8/2013 Sledge ................... A63H 33/22
463/31
(Continued)

FOREIGN PATENT DOCUMENTS

JP 2002-032168 A 1/2002
JP 2010-091609 A 4/2010
(Continued)

*Primary Examiner* — Calvin C Ma
(74) *Attorney, Agent, or Firm* — ScienBiziP, P.C.

(57) ABSTRACT

A display device includes a display unit having a function of showing a space behind a display screen transparently and a control unit for controlling the display unit based on an input video signal. The control unit controls the display unit to display a transparent video having a transparent portion through which the space behind the display screen can be seen transparently, while displaying a main video based on the input video signal. The control unit may generate an instruction signal indicating a display period of the transparent video and may control the display unit in accordance with the generated instruction signal, or may control the display unit in accordance with an instruction signal provided externally. With this, there is provided a see-through type display device which does not hinder a vision when displaying a video for a long time.

12 Claims, 8 Drawing Sheets

(51) Int. Cl.
*G09G 3/20* (2006.01)
*H01L 51/50* (2006.01)
*G09G 3/36* (2006.01)
*A47F 11/06* (2006.01)
*G02F 1/1335* (2006.01)
*G09G 3/3208* (2016.01)
*H01L 51/52* (2006.01)

(52) U.S. Cl.
CPC ............ *G09G 3/20* (2013.01); *G09G 3/3648* (2013.01); *H01L 51/50* (2013.01); *G02F 1/133615* (2013.01); *G09G 3/3208* (2013.01); *G09G 3/36* (2013.01); *G09G 2310/0235* (2013.01); *G09G 2310/08* (2013.01); *G09G 2320/0233* (2013.01); *G09G 2320/0626* (2013.01); *H01L 51/5234* (2013.01)

(58) Field of Classification Search
USPC .................................. 345/87, 173, 174, 690
See application file for complete search history.

(56) References Cited

U.S. PATENT DOCUMENTS

| | | |
|---|---|---|
| 2014/0009415 A1 | 1/2014 | Nishida |
| 2014/0049620 A1 | 2/2014 | Sun et al. |
| 2014/0184577 A1* | 7/2014 | Kim .................. G09G 5/10 |
| | | 345/207 |

FOREIGN PATENT DOCUMENTS

| | | |
|---|---|---|
| JP | 2011-082798 A | 4/2011 |
| JP | 2012-058353 A | 3/2012 |
| JP | 2012-058363 A | 3/2012 |
| JP | 2013-025459 A | 2/2013 |
| JP | 2014-029673 A | 2/2014 |
| JP | 2014-039234 A | 2/2014 |

* cited by examiner

MAIN VIDEO       TRANSPARENT VIDEO

DISPLAY DEVICE AND CONTROL METHOD THEREFOR

TECHNICAL FIELD

The present invention relates to a display device, especially to a display device having a function of showing a space behind a display screen transparently and a control method for the same.

BACKGROUND ART

In recent years, a display device having a function of showing a space behind a display screen transparently (hereinafter referred to as a see-through type display device) has been developed. The see-through type display device is also called a transparent display or a see-through display. For example, a see-through type liquid crystal display device can be constituted by disposing, behind a liquid crystal panel, an edge light type backlight having a transparent light guide plate. In the see-through type liquid crystal display device constituted like this, when the backlight is turned off and transmittance of pixels in the liquid crystal panel is controlled to be high, a space behind the liquid crystal panel can be seen transparently. Patent Document 1 discloses a see-through type liquid crystal display device having a shutter film disposed behind a liquid crystal panel. Furthermore, a see-through type organic electro-luminescence (hereinafter referred to as EL) display device having a transparent pixel electrode has also been developed.

The see-through type display device is placed and used in a public facility, a commercial facility, an amusement machine, or the like. According to the see-through type display device, the space behind the display screen can be seen transparently when a video is not displayed. The see-through type display device has an advantage that the device blends into surrounding circumstances and does not hinder a vision.

Relating to the present invention, Patent Document 2 discloses determining transparency of display based on a passing time from last used time of a window, when performing multi-window display.

PRIOR ART DOCUMENTS

Patent Documents

[Patent Document 1] Japanese Laid-Open Patent Publication No. 2010-91609
[Patent Document 2] Japanese Laid-Open Patent Publication No. 2002-32168

SUMMARY OF THE INVENTION

Problems to Be Solved By the Invention

However, a conventional see-through type display device has a problem that when the device displays a video for a long time, a situation where the space behind the display screen can not be seen continues and the device hinders the vision.

Therefore, an object of the present invention is to provide a see-through type display device which does not hinder a vision when displaying a video for a long time.

Means for Solving the Problems

According to a first aspect of the present invention, there is provided a display device including: a display unit having a function of showing a space behind a display screen transparently; and a control unit configured to control the display unit based on an input video signal, wherein the control unit is configured to control the display unit to display a transparent video based on a video signal different from the input video signal, the transparent video having a transparent portion through which the space behind the display screen can be seen transparently, while displaying a main video based on the input video signal.

According to a second aspect of the present invention, in the first aspect of the present invention, the control unit is configured to output the input video signal to the display unit in a display period of the main video and output a video signal of the transparent video to the display unit in a display period of the transparent video.

According to a third aspect of the present invention, in the second aspect of the present invention, the control unit includes an instruction signal generation unit configured to generate an instruction signal indicating the display period of the transparent video, and is configured to control the display unit in accordance with the generated instruction signal.

According to a fourth aspect of the present invention, in the second aspect of the present invention, the control unit is configured to control the display unit in accordance with an instruction signal provided externally and indicating the display period of the transparent video.

According to a fifth aspect of the present invention, in the second aspect of the present invention, the transparent video consists of images, each of which has the transparent portion at least mostly.

According to a sixth aspect of the present invention, in the fifth aspect of the present invention, the video signal of the transparent portion is a signal corresponding to a maximum brightness or a minimum brightness.

According to a seventh aspect of the present invention, in the second aspect of the present invention, the display unit includes a liquid crystal panel, a transparent light guide plate disposed in back of the liquid crystal panel, and a light source disposed on a side surface of the transparent light guide plate, and the control unit is configured to turn on the light source in the display period of the main video, and turn off the light source and output, to the display unit, a video signal having a high brightness portion as the transparent portion in the display period of the transparent video.

According to an eighth aspect of the present invention, in the second aspect of the present invention, the display unit includes a liquid crystal panel, a box-type cabinet disposed in back of the liquid crystal panel, and a light source configured to irradiate an inside of the box-type cabinet with light, and the control unit is configured to output, to the display unit, a video signal including a high brightness portion as the transparent portion in the display period of the transparent video.

According to a ninth aspect of the present invention, in the seventh or eighth aspect of the present invention, the display unit is configured to perform color display by field-sequential drive.

According to a tenth aspect of the present invention, in the second aspect of the present invention, the display unit includes an organic electro-luminescence panel having a transparent pixel electrode, and the control unit is configured to output, to the display unit, a video signal including a low brightness portion as the transparent portion in the display period of the transparent video.

According to an eleventh aspect of the present invention, in the second aspect of the present invention, the display unit includes a transparent screen and a projector configured to project a video on the transparent screen, and the control unit is configured to output, to the display unit, a video signal including a low brightness portion as the transparent portion in the display period of the transparent video.

According to a twelfth aspect of the present invention, there is provided a method for controlling a display device including a display unit having a function of showing a space behind a display screen transparently, the method including the steps of: controlling the display unit to display a main video based on an input video signal; and controlling the display unit to display a transparent video having a transparent portion through which the space behind the display screen can be seen transparently, while displaying the main video.

According to a thirteenth aspect of the present invention, in the twelfth aspect of the present invention, the method for controlling the display device further includes a step of supplying a video signal of the transparent video in place of a video signal of the main video as the input video signal in a display period of the transparent video.

According to a fourteenth aspect of the present invention, in the twelfth aspect of the present invention, controlling to display the transparent video includes controlling the display unit to display the transparent video based on a video signal different from the input video signal, while displaying the main video.

Effects of the Invention

According to the first or fourteenth aspect of the present invention, the transparent video is displayed based on the video signal different from the input video signal, while the main video is displayed based on the input video signal.

Therefore, it is possible to show the space behind the display screen transparently and prevent from hindering the vision, by displaying the transparent video in the middle of displaying the main video for a long time.

According to the second aspect of the present invention, it is possible to display the transparent video by switching while displaying the main video and prevent from hindering the vision when displaying the main video for a long time, by outputting the input video signal and the video signal of the transparent video to the display unit in a switching manner.

According to the third aspect of the present invention, even when the display period of the transparent video is not determined at the outside of the display device, the display period of the transparent video can be determined in the display device and the transparent video can be displayed.

According to the fourth aspect of the present invention, the display period of the transparent video can be determined suitably in accordance with a content of the main video, by determining the display period of the transparent video at the outside of the display device.

According to the fifth aspect of the present invention, it is possible to show the space behind the display screen in a wide range transparently in the display period of the transparent video.

According to the sixth aspect of the present invention, it is possible to increase transmittance of the transparent portion and show the space behind the display screen with a high transmittance, by setting the video signal of the transparent portion as the signal corresponding to the maximum brightness or the minimum brightness in accordance with a configuration of the display unit.

According to the seventh aspect of the present invention, it is possible to prevent from hindering the vision when displaying the main video for a long time in a see-through type liquid crystal display device having the liquid crystal panel, the transparent light guide plate and the light source.

According to the eighth aspect of the present invention, it is possible to prevent from hindering the vision when displaying the main video for a long time in a see-through type liquid crystal display device having the liquid crystal panel, the box-type cabinet, and the light source.

According to the ninth aspect of the present invention, since the display unit performs the field-sequential drive, a liquid crystal panel without a color filter can be used. Therefore, it is possible to increase transmittance of the liquid crystal panel and show the space behind the display screen with a high transmittance.

According to the tenth aspect of the present invention, it is possible to prevent from hindering the vision when displaying the main video for a long time in a see-through type organic EL display device having the transparent organic EL panel.

According to the eleventh aspect of the present invention, it is possible to prevent from hindering the vision when displaying the main video for a long time in a see-through type projection display device having the transparent screen and the projector.

According to the twelfth aspect of the present invention, the transparent video is displayed while the main video is displayed based on the input video signal. Therefore, it is possible to show the space behind the display screen transparently and prevent from hindering the vision, by displaying the transparent video in the middle of displaying the main video for a long time.

According to the thirteenth aspect of the present invention, by supplying the video signal of the transparent video in place of the video signal of the main video as the input video signal in the display period of the transparent video, the transparent video is displayed while the main video is displayed. Thus, it is possible to prevent from hindering the vision when displaying the main video for a long time.

MODES FOR CARRYING OUT THE INVENTION

Figure 1:
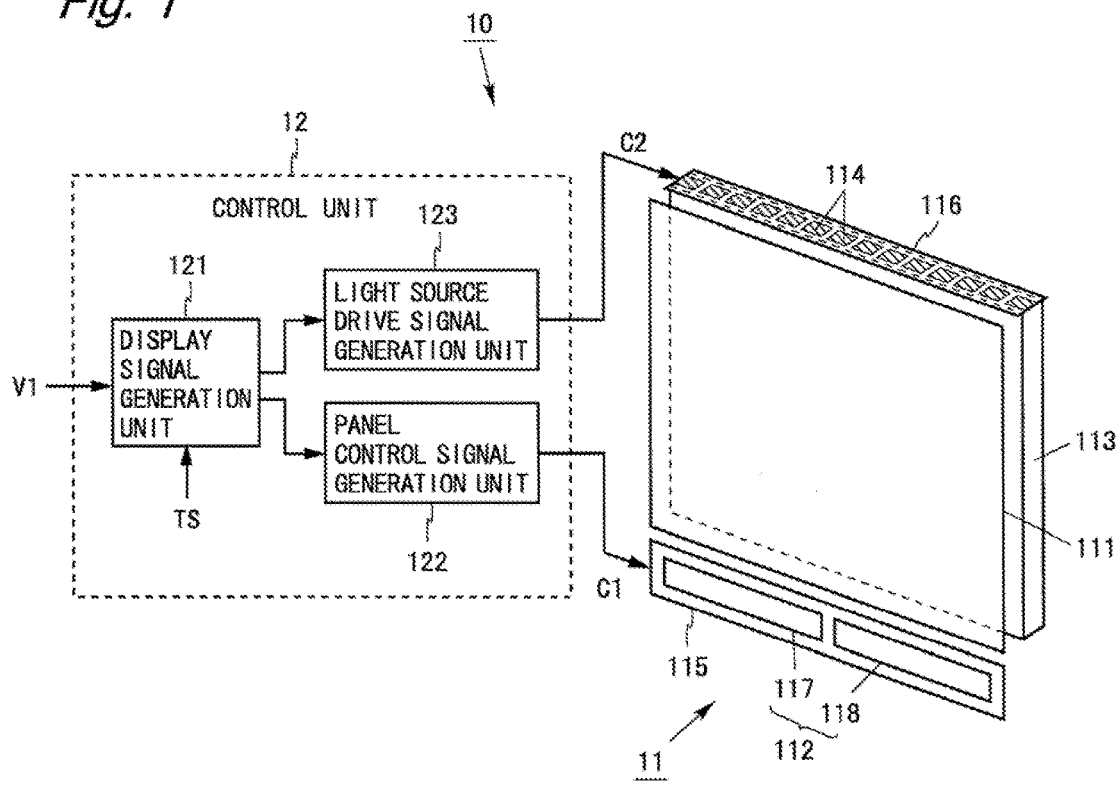
FIG. 1 is a block diagram showing a configuration of a display device according to a first embodiment of the present invention.

In the following, display devices according to first to fourth embodiments of the present invention will be described referring to the drawings. The display device according to each embodiment of the present invention is a see-through type display device having a function of showing a space behind a display screen transparently. Hereinafter, it is assumed that m and n are integers not less than 2. Furthermore, "transparent" means not only a transparent state in which an existence of elements can almost hardly be recognized, but also a state in which a space behind the elements can be seen transparently to some extent, although the existence of the elements can be recognized.

(First Embodiment)

FIG. 1 is a block diagram showing a configuration of a display device according to a first embodiment of the present invention. A display device 10 shown in FIG. 1 is a see-through type liquid crystal display device including a display unit 11 and a control unit 12. The display unit 11 includes a liquid crystal panel 111, a panel drive circuit 112, a transparent light guide plate 113, and a light source 114. The panel drive circuit 112 is provided on a panel drive substrate 115, and the light source 114 is provided on a light source substrate 116. The control unit 12 includes a display signal generation unit 121, a panel control signal generation unit 122, and a light source drive signal generation unit 123.

Figure 2:
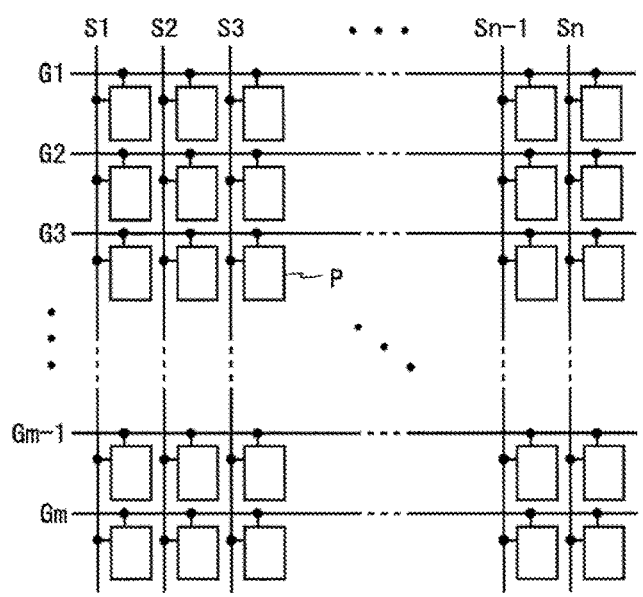
FIG. 2 is a diagram showing details of a liquid crystal panel of the display device shown in FIG. 1.

FIG. 2 is a diagram showing details of the liquid crystal panel 111. As shown in FIG. 2, the liquid crystal panel 111 includes m scanning lines G1 to Gm, n data lines S1 to Sn, and (m×n) pixels P. The scanning lines G1 to Gm are arranged in parallel to each other. The data lines S1 to Sn are arranged in parallel to each other so as to intersect with the scanning lines G1 to Gm perpendicularly. The scanning lines G1 to Gm and the data lines S1 to Sn intersect at (m×n) points. The (m×n) pixels P are arranged corresponding to the intersections of the scanning lines G1 to Gm and the data lines S1 to Sn.

The liquid crystal panel 111 includes a color filter (not shown) having a red portion, a green portion, and a blue portion.

The pixels P corresponding to the red portion, the green portion, and the blue portion of the color filter function as a red sub-pixel, a green sub-pixel, and a blue sub-pixel, respectively. The red sub-pixel, the green sub-pixel, and the blue sub-pixel aligned along an extending direction of the scanning lines G1 to Gm constitute one color pixel. The (m×n) pixels P correspond to (m×n/3) color pixels.

The panel drive substrate 115 is disposed in a position so as not to overlap with the liquid crystal panel 111. In FIG. 1, the panel drive substrate 115 is disposed along a lower side of the liquid crystal panel 111. A scanning line drive circuit 117 and a data line drive circuit 118 are provided on the panel drive substrate 115 as the panel drive circuit 112. Note that all or part of the scanning line drive circuit 117 and the data line drive circuit 118 may be formed with the liquid crystal panel 111 monolithically.

The panel control signal generation unit 122 outputs a panel control signal C1 to the scanning line drive circuit 117 and the data line drive circuit 118. The scanning line drive circuit 117 selects the scanning lines G1 to Gm sequentially for one line period (for 1H period) based on the panel control signal C1. With this, n pixels P (pixels in one row) connected to the selected scanning line are selected for one line period. The data line drive circuit 118 applies n voltages in accordance the video signal (hereinafter referred to as data voltages) included in the panel control signal C1, based on the panel control signal C1 to the data lines S1 to Sn, respectively. With this, the n data voltages are written to the n selected pixels P, respectively. Transmittance of the pixel P changes in accordance with the written data voltage.

The transparent light guide plate 113 is a light guide plate made of a transparent material. The transparent light guide plate 113 is disposed in back of the liquid crystal panel 111, in a position so as to overlap with the liquid crystal panel 111. The light source substrate 116 is disposed in a position so as not to overlap with the liquid crystal panel 111. In FIG. 1, the light source substrate 116 is disposed along an upper side of the transparent light guide plate 113. One or more light sources 114 for emitting white light are provided on the light source substrate 116. As the light source 114, a light emitting diode or a cold cathode fluorescent tube is used, for example.

The light source drive signal generation unit 123 outputs a light source drive signal C2 to the light source 114. The light source 114 turns on or turns off in accordance with the light source drive signal C2. When the light source 114 turns on, light (white light) emitted from the light source 114 propagates through the transparent light guide plate 113, and is emitted from a surface of the transparent light guide plate 113, the surface on a side of the liquid crystal panel 111. As described, the transparent light guide plate 113 and the light source 114 function as a backlight which turns on and turns off.

An input video signal V1 is supplied externally to the display device 10. Based on the input video signal V1 and a transparent instruction signal TS (details will be described later), the display signal generation unit 121 outputs a video signal used for driving the liquid crystal panel 111 to the panel control signal generation unit 122, and outputs a control signal indicating turn-on state of the light source 114 to the light source drive signal generation unit 123. The panel control signal generation unit 122 outputs, to the panel drive circuit 112, a control signal including the video signal which is output from the display signal generation unit 121. The light source drive signal generation unit 123 outputs, to the light source 114, a control signal which is output from the display signal generation unit 121.

When the light source 114 turns on, the transparent light guide plate 113 is in a scattering state (clouded state). At this time, an image in accordance with the video signal is displayed on the liquid crystal panel 111. When the light source 114 turns off, the transparent light guide plate 113 is in a transparent state. Furthermore, the pixel P having a high transmittance is transparent. Therefore, when the light source 114 turns off, a space behind the liquid crystal panel 111 (a space behind the display screen) can be seen transparently through the pixel P having a high grayscale and the transparent light guide plate 113.

The control unit 12 controls the display unit 11 to display a video (hereinafter referred to a transparent video) having a transparent portion through which the space behind the display screen can be seen transparently, while displaying a video (hereinafter referred to a main video) based on the input video signal V1. The transparent video has a content different from that in the main video. The transparent video consists of images, each of which has the transparent portion at least mostly. The transparent video includes an image the whole of which is the transparent portion, an image most of which is the transparent portion, and so on. In the display device 10, the video signal of the transparent portion included in the transparent video is set to a signal corresponding to the maximum brightness, for example.

Figure 3:
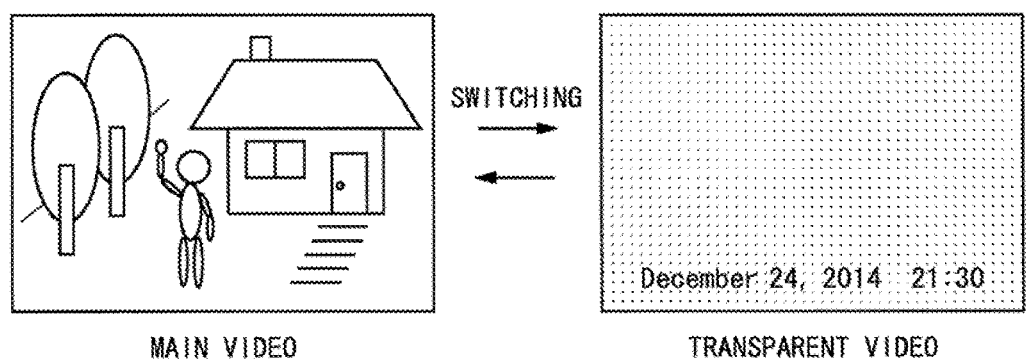
FIG. 3 is a diagram showing switching of a display video in the display device shown in FIG. 1.

FIG. 3 is a diagram showing switching of a display video in the display device 10. An image included in the main video is depicted in a left side of FIG. 3, and an image included in the transparent video is depicted in a right side of FIG. 3. A dot pattern portion in FIG. 3 represents the transparent portion through which the space behind the display screen can be seen transparently. In the image included in the transparent video shown in FIG. 3, a portion other than a portion where characters are displayed is the transparent portion.

Figure 4:
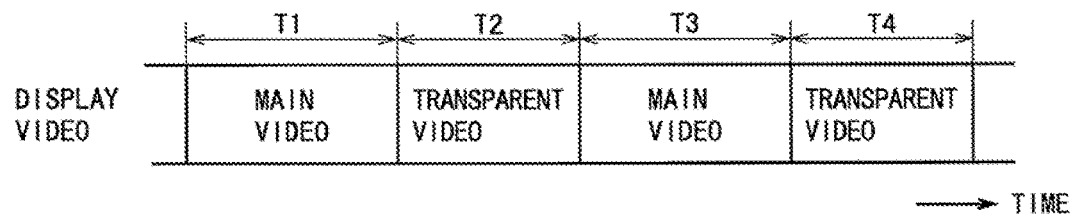
FIG. 4 is a diagram showing display periods of a main video and a transparent video in the display device shown in FIG. 1.

FIG. 4 is a diagram showing display periods of the main video and the transparent video in the display device 10. Under the control of the control unit 12, the display unit 11 displays the main video in a period T1, next displays the transparent video in a period T2, next displays the main video in a period T3, and next displays the transparent video in a period T4. The display unit 11 performs this operation repeatedly.

A display period length of the main video and that of the transparent video are arbitrary. The display period length of the main video and that of the transparent video are determined in a range from several seconds to several minutes, for example. The display period length of the main video may be the same for all, or may be different from each other. The same holds true for the display period length of the transparent video. The display period length of the main video and that of the transparent video may be the same, or may be different. For example, as shown in FIG. 4, the display period length of the transparent video may be determined to be shorter than that of the main video.

The transparent instruction signal TS indicating a display period of the transparent video is supplied to the display signal generation unit 121. The transparent instruction signal TS changes by a unit of one frame period. Hereinafter, it is assumed that the transparent instruction signal TS is in a low level in the display period of the main video, and is in a high level in the display period of the transparent video.

When the transparent instruction signal TS is in the low level (indicating display period of the main video), the display signal generation unit 121 outputs a control signal for turning on the light source 114 to the light source drive signal generation unit 123, and outputs the input video signal V1 to the panel control signal generation unit 122. At this time, the light source 114 turns on, and the main video based on the input video signal V1 is displayed on the liquid crystal panel 111.

When the transparent instruction signal TS is in the high level (indicating display period of the transparent video), the display signal generation unit 121 outputs the control signal for turning off the light source 114 to the light source drive signal generation unit 123, and outputs the video signal of the transparent video to the panel control signal generation unit 122. The video signal of the transparent video is a video signal having a high brightness portion as the transparent portion. At this time, the light source 114 turns off, and the transparent video is displayed on the liquid crystal panel 111. The space behind the display screen can be seen transparently through the transparent portion having the high brightness included in the transparent video.

The transparent instruction signal TS and switching of the video signal in the display device 10 will be described below. As for the transparent instruction signal TS, there are a method for generating the signal in the display signal generation unit 121 and a method for supplying the signal from the outside of the display device 10. Also, as for switching the video signal, there are a method for switching in the display signal generation unit 121 and a method for switching at the outside of the display device 10.

Figure 5:
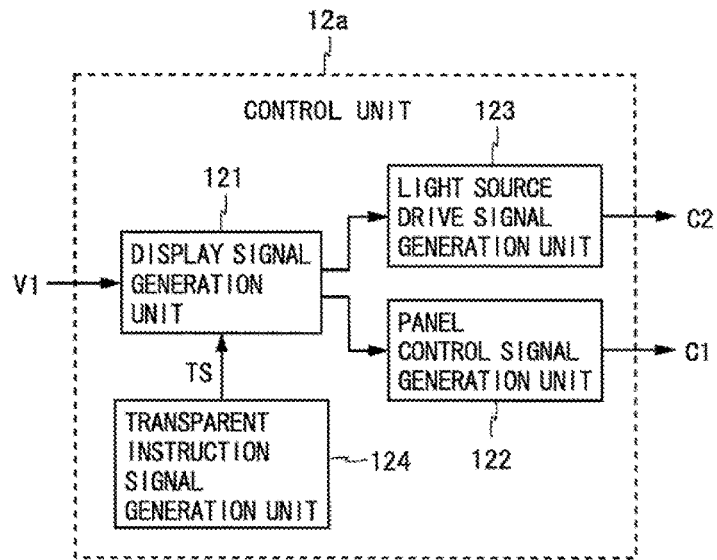
FIG. 5 is a diagram showing a first configuration example of a control unit of the display device shown in FIG. 1.

FIG. 5 is a diagram showing a first configuration example of the control unit 12. The control unit 12a shown in FIG. 5 includes a transparent instruction signal generation unit 124 for generating the transparent instruction signal TS. The transparent instruction signal generation unit 124 has a timer function (or a function of counting a number of displayed images), and sets the transparent instruction signal TS to the low level and the high level in a switching manner independently from the input video signal V1. By setting an output time of the transparent instruction signal TS having the high level shorter than that of the transparent instruction signal TS having the low level, display period of the transparent video can be made shorter than that of the main video.

Figure 6:
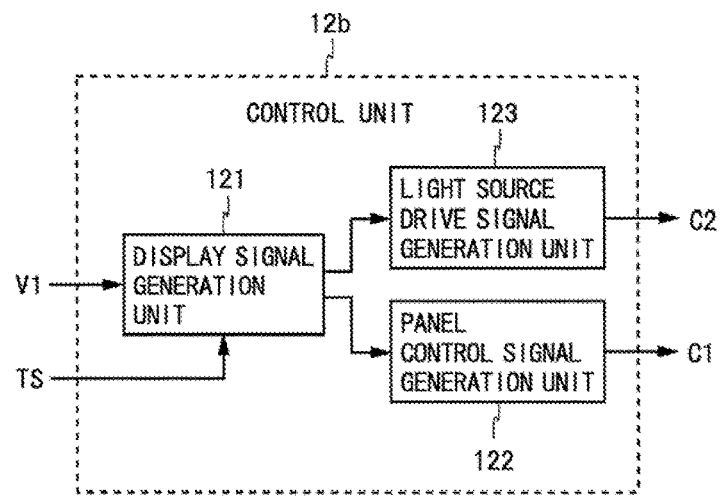
FIG. 6 is a diagram showing a second configuration example of the control unit of the display device shown in FIG. 1.

FIG. 6 is a diagram showing a second configuration example of the control unit 12. The control unit 12b shown in FIG. 6 does not include the transparent instruction signal generation unit. The transparent instruction signal TS is supplied from the outside of the display device 10 to the display signal generation unit 121. The transparent instruction signal TS is supplied using a signal line different from that for the input video signal V1.

Figure 7:
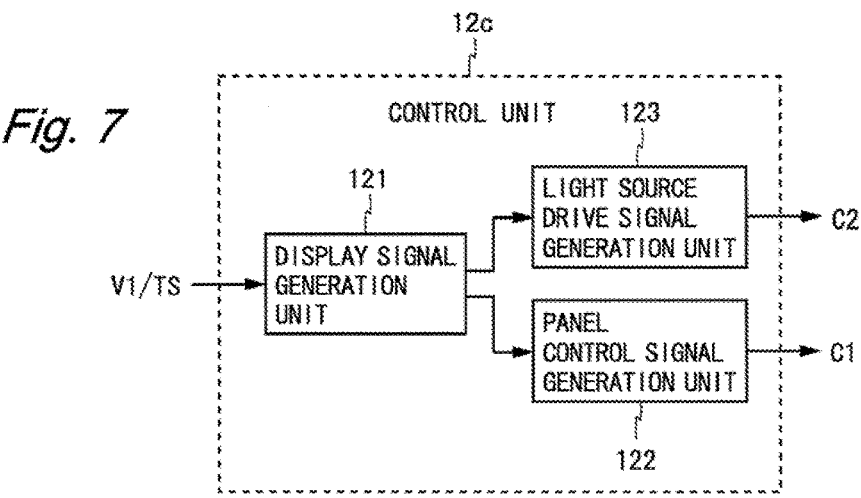
FIG. 7 is a diagram showing a third configuration example of the control unit of the display device shown in FIG. 1.

FIG. 7 is a diagram showing a third configuration example of the control unit 12. The control unit 12c shown in FIG. 7 does not include the transparent instruction signal generation unit. The transparent instruction signal TS is supplied from the outside of the display device 10 to the display signal generation unit 121. The transparent instruction signal TS is supplied using the same signal line as that for the input video signal V1, at a timing different from that for the input video signal V1. Alternatively, the transparent instruction signal TS may be supplied, with being included in the input video signal V1.

When the control unit 12a is used, even though the display period of the transparent video is not determined at the outside of the display device 10, it is possible to determine the display period of the transparent video in the display device 10 and display the transparent video. When either of the control units 12b, 12c is used, the display period of the transparent video can be determined suitably in accordance with a content of the main video, by determining the display period of the transparent video at the outside of the display device 10.

When one of the control unit 12a to 12c is used, the video signal can be switched in the display signal generation unit 121. In this case, the display signal generation unit 121 generates the video signal of the transparent video, or stores the signal in advance. When the transparent instruction signal TS is in the high level, the display signal generation unit 121 outputs the generated or stored video signal of the transparent video to the panel control signal generation unit 122.

Figure 8:
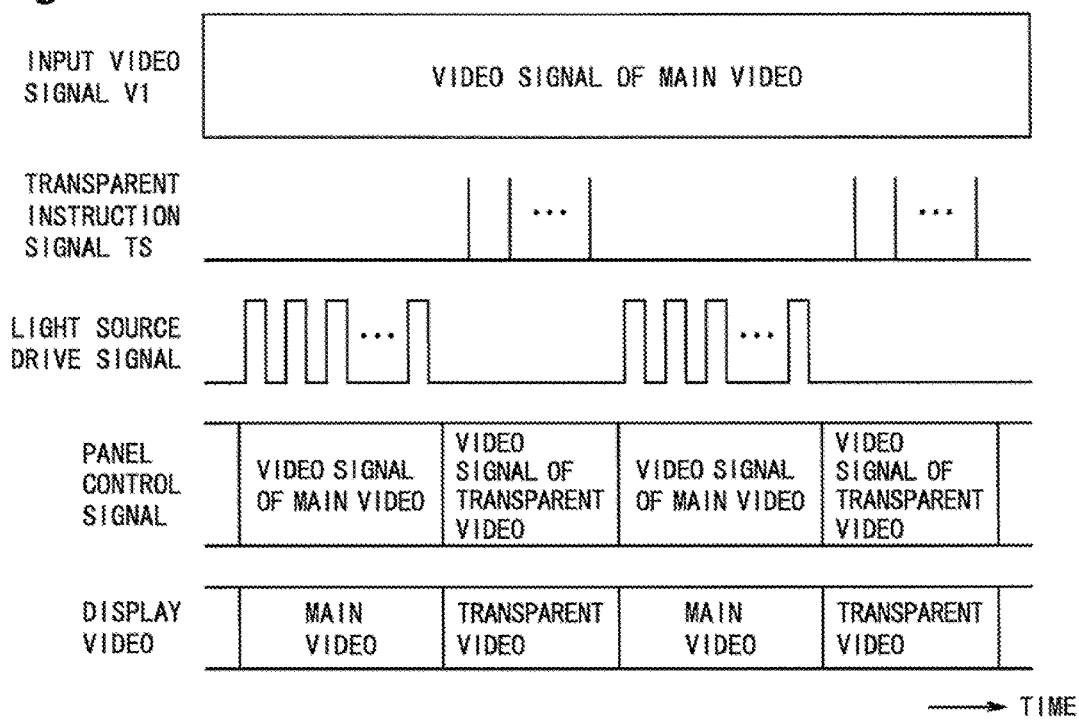
FIG. 8 is a timing chart of a first example of the display device shown in FIG. 1.

FIG. 8 is a timing chart for a case where the video signal is switched by the display signal generation unit 121. When the transparent instruction signal TS is in the low level, the light source drive signal generation unit 123 outputs the light source drive signal, and the panel control signal generation unit 122 outputs the input video signal (video signal of the main video). When the transparent instruction signal TS is in the high level, the light source drive signal generation unit 123 does not output the light source drive signal, and the panel control signal generation unit 122 outputs the video signal of the transparent video. As a result, the main video is displayed in the display period of the main video, and the transparent video is displayed in the display period of the transparent video.

When either of the control units 12b, 12c is used, the video signal can be switched at the outside of the display device 10. In this case, the video signal of the transparent video is supplied to the display device 10 in place of the video signal of the main video as the input video signal V1 in the display period of the transparent video. The display signal generation unit 121 outputs the input video signal V1 to the panel control signal generation unit 122, irrespective of the transparent instruction signal TS.

Figure 9:
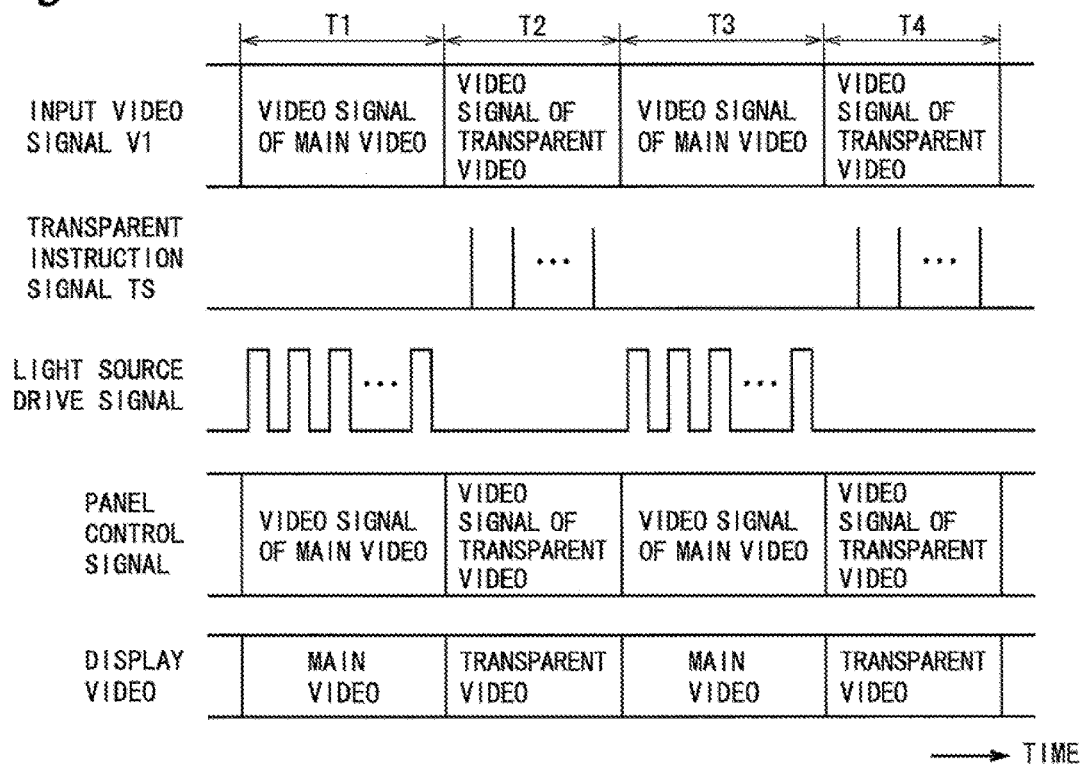
FIG. 9 is a timing chart of a second example of the display device shown in FIG. 1.

FIG. 9 is a timing chart for a case where the video signal is switched at the outside of the display device 10. When the transparent instruction signal TS is in the low level, the light source drive signal generation unit 123 outputs the light source drive signal. When the transparent instruction signal TS is in the high level, the light source drive signal generation unit 123 does not output the light source drive signal. The panel control signal generation unit 122 always outputs the input video signal V1. With this, the panel control signal generation unit 122 outputs the video signal of the main video when the transparent instruction signal TS is in the low level, and outputs the video signal of the transparent video when the transparent instruction signal TS is in the high level.

Note that although in FIGS. 8 and 9, the transparent instruction signal TS and the light source drive signal are in the high level for a predetermined time in one frame period, these signals may be in the high level for one frame period.

The display device 10 is placed and used in a public facility, a commercial facility, an amusement machine, and the like, for example. As described above, the conventional see-through type display device has a problem that a situation where the space behind the display screen cannot be seen continues and the device hinders the vision when displaying a video for a long time. On the contrary, the display device 10 displays the transparent video while displaying the main video based on the input video signal V1. Therefore, it is possible to show the space behind the display screen transparently and prevent from hindering the vision, by displaying the transparent video in the middle of displaying the main video for a long time.

As described above, the display device 10 according to the present embodiment includes the display unit 11 having a function of showing behind the display screen transparently, and the control unit 12 for controlling the display unit 11 based on the input video signal V1. In a case where the control unit 12 switches the video signal, the control unit 12 controls the display unit 11 to display the transparent video based on the video signal different from the input video signal V1, the transparent video having the transparent portion through which the space behind the display screen can be seen transparently, while displaying the main video based on the input video signal V1. Therefore, it is possible to show the space behind the display screen transparently and prevent from hindering the vision by displaying the transparent video in the middle of displaying the main video for a long time.

The control unit 12 outputs the input video signal to the display unit 11 in the display period of the main video, and outputs the video signal of the transparent video to the display unit 11 in the display period of the transparent video. By thus outputting the input video signal V1 and the video signal of the transparent video to the display unit 11 in a switching manner, the above-described effects can be attained. Note that, in a case where the control unit 12 does not switch the video signal, the above-described effects can be attained by supplying, to the display device 10, the video signal of the transparent video in place of the video signal of the main video as the input video signal V1 in the display period of the transparent video. Furthermore, in the see-through type liquid crystal display device having the liquid crystal panel 111, the transparent light guide plate 113, and the light source 114, the above-described effects can be attained.

Furthermore, it is possible to show the space behind the display screen in a wide range transparently in the display period of the transparent video by using the transparent video consisting of images, each of which has the transparent portion at least mostly. Furthermore, it is possible to increase transmittance of the transparent portion and show the space behind the display screen with a high transmittance by setting the video signal of the transparent portion to a signal corresponding to the maximum brightness.

Note that as a variant of the present embodiment, a field-sequential, see-through type liquid crystal display device can be constituted. In the display device according to the variant, the liquid crystal panel does not have the color filter, and the (m×n) pixels correspond to (m×n) color pixel. The light source includes a red light source for emitting red light, a green light source for emitting a green light, and a blue light source for emitting blue light. The display unit divides one frame period into first to third field periods and performs field-sequential drive. In the first field period, the red light source turns on and a red image based on a red video signal is displayed on the liquid crystal panel. Similarly, a green image is displayed in the second field period, and a blue image is displayed in the third field period. Color display can be performed by displaying three kinds of images successively. According to the display device of the variant, since the display unit performs the field-sequential drive, a liquid crystal panel without a color filter can be used. Therefore, it is possible to increase transmittance of the liquid crystal panel and show the space behind the display screen with a high transmittance.

(Second Embodiment)

Figure 10:
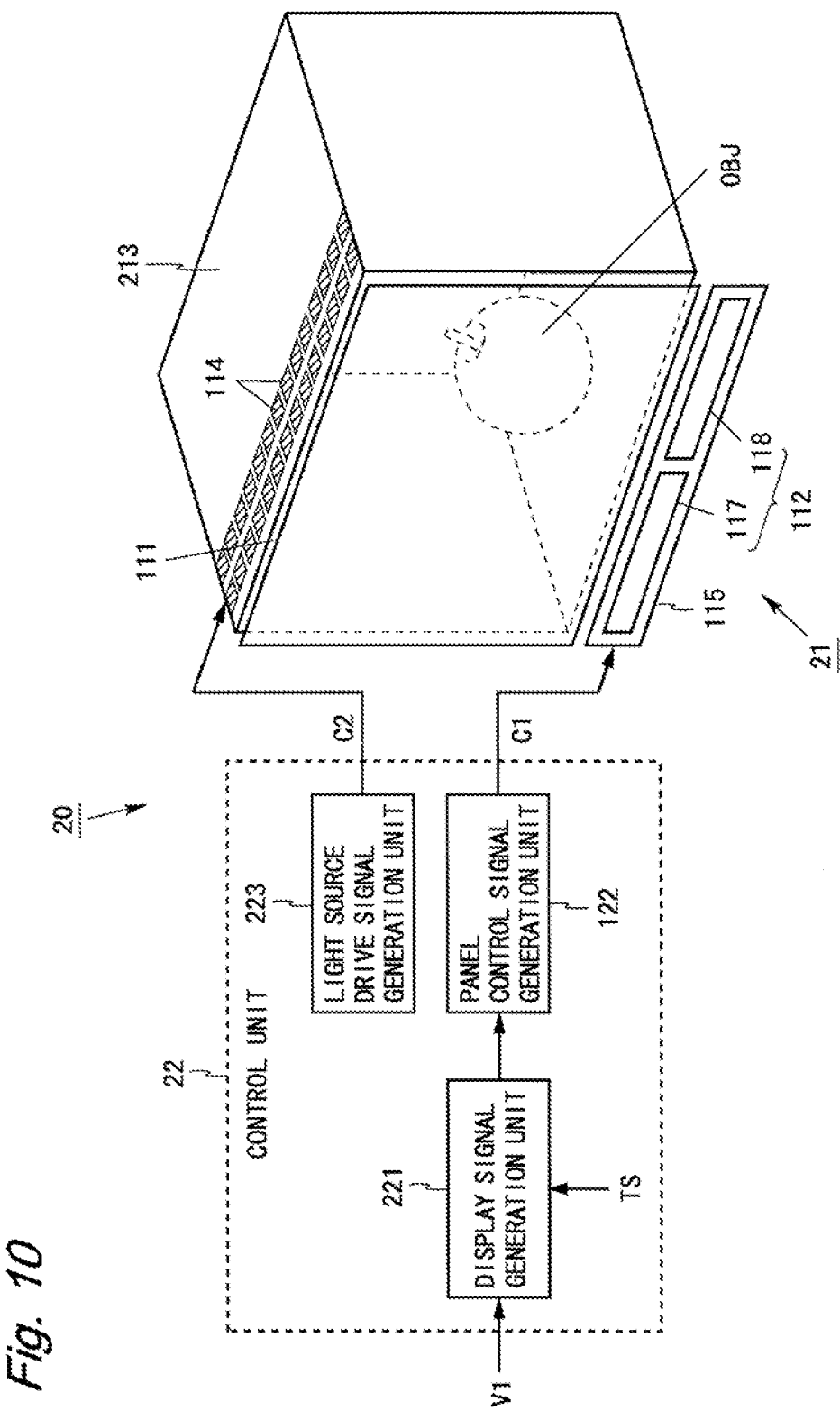
FIG. 10 is a block diagram showing a configuration of a display device according to a second embodiment of the present invention.

FIG. 10 is a block diagram showing a configuration of a display device according to a second embodiment of the present invention. A display device 20 shown in FIG. 10 is a see-through type liquid crystal display device including a display unit 21 and a control unit 22. In the following embodiments, of the components of each embodiment, the same components as those of former-described embodiment are provided with the same reference characters and their descriptions are omitted.

The display unit 21 includes the liquid crystal panel 111, the panel drive circuit 112, a box-type cabinet 213, and the light source 114. The control unit 22 includes a display signal generation unit 221, the panel control signal generation unit 122, and a light source drive signal generation unit 223.

The box-type cabinet 213 has a cuboid shape and five surfaces. The liquid crystal panel 111 is placed at a portion where the surface of the box-type cabinet 213 does not exist. The box-type cabinet 213 is placed so that the liquid crystal panel 111 corresponds to a side surface, for example. The light source 114 is provided to a top surface, a bottom surface, or a side surface of the box-type cabinet 213. In FIG. 10, the light source 114 is provided to the top surface of the box-type cabinet 213. When the display device 20 operates, the light source 114 always turns on and irradiates an inside of the box-type cabinet 213 with white light. The inside of the box-type cabinet 213 is painted white so that light from the light source 114 reflects well.

An exhibition object OBJ is placed in the box-type cabinet 213. When transmittance of the pixel P in the liquid crystal panel 111 is controlled to be high, the pixel P becomes transparent. Therefore, the space behind the liquid crystal panel 111 (space behind the display screen) can be seen transparently through the pixel P having a high transmittance. With this, it is possible to show the video displayed on the liquid crystal panel 111 and the exhibition object OBJ placed in the box-type cabinet 213 in an overlapping manner.

The control unit 22 controls the display unit 21 to display the transparent video while displaying the main video based on the input video signal V1. In the display device 20, the video signal of the transparent portion included in the transparent video is set to a signal corresponding to the maximum brightness, for example. The light source drive signal generation unit 223 outputs a drive signal for always turning on the light source 114. When the transparent instruction signal TS is in the low level (indicating display period of the main video), the display signal generation unit 221 outputs the input video signal V1 to the panel control signal generation unit 122. At this time, the main video is displayed on the liquid crystal panel 111. When the transparent instruction signal TS is in the high level (indicating display period of the transparent video), the display signal generation unit 221 outputs the video signal of the transparent video to the panel control signal generation unit 122. At this time, the transparent video is displayed on the liquid crystal panel 111.

Figure 11:
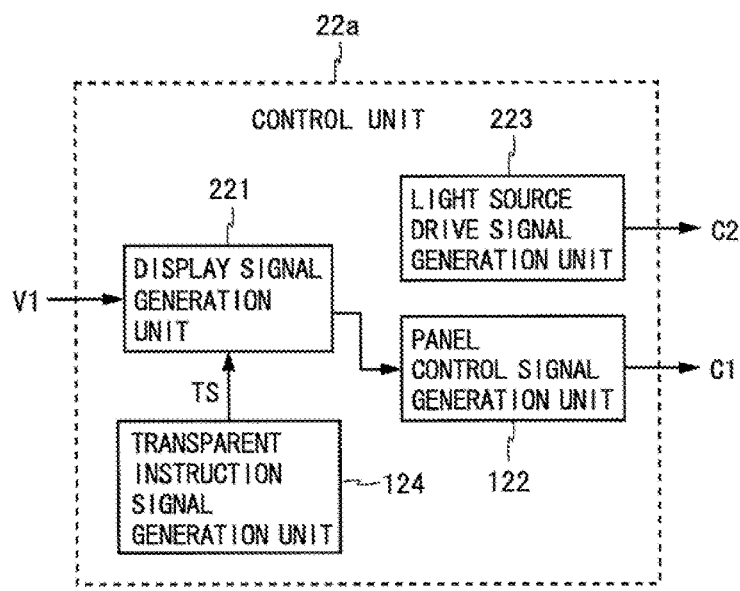
FIG. 11 is a diagram showing a first configuration example of a control unit of the display device shown in FIG. 10.
Figure 12:
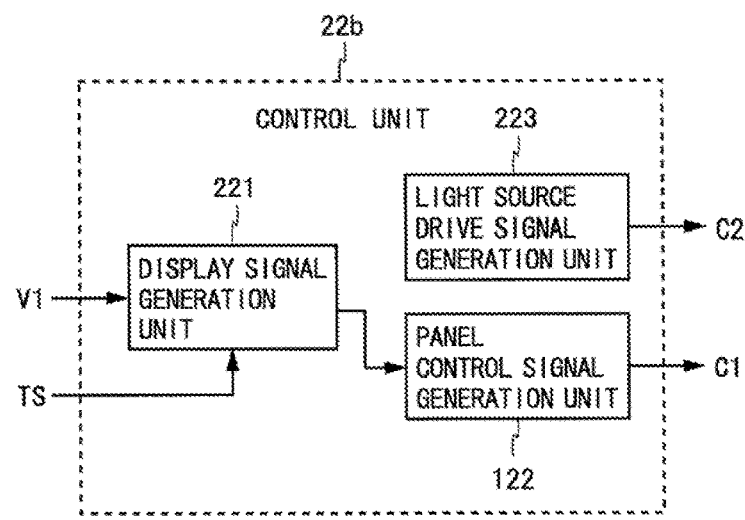
FIG. 12 is a diagram showing a second configuration example of the control unit of the display device shown in FIG. 10.
Figure 13:
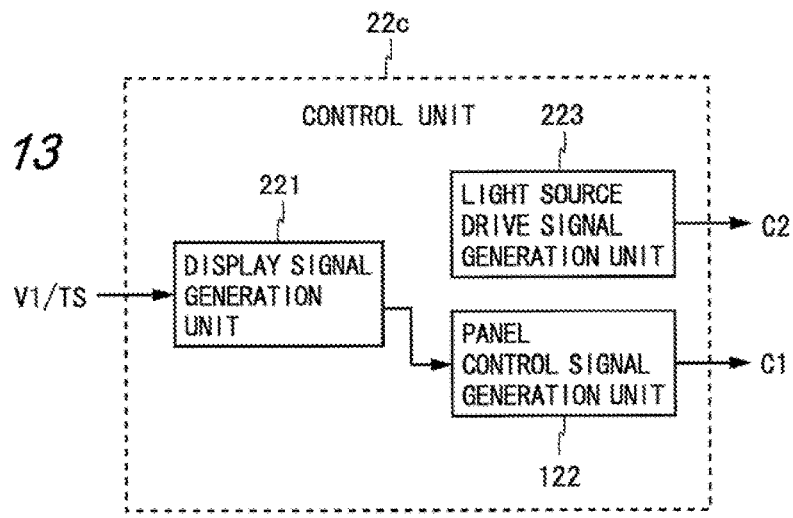
FIG. 13 is a diagram showing a third configuration example of the control unit of the display device shown in FIG. 10.

As for the display device 20, there are a method for switching the video signal in the display signal generation unit 221 and a method for switching at the outside of the display device 20. When the video signal is switched in the display signal generation unit 221, one of the control units 22a to 22c shown in FIGS. 11 to 13 is used. Since the operations of the control units 22a to 22c included in the display signal generation unit 221 are the same as those of the first embodiment except that a control signal is not output to the light source drive signal generation unit 223, their descriptions are omitted here.

Figure 14:
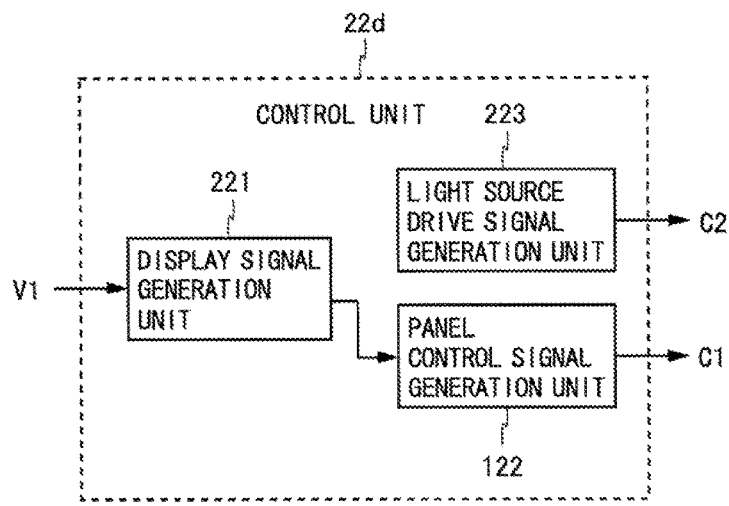
FIG. 14 is a diagram showing a fourth configuration example of the control unit of the display device shown in FIG. 10.

When the video signal is switched at the outside of the display device 20, it is not necessary to use the transparent instruction signal TS, because the transparent video can be represented using the input video signal V1. Thus, the control unit 22d shown in FIG. 14 is used in the control unit 22d shown in FIG. 14, the display signal generation unit 221 outputs the input video signal V1 as it is to the panel control signal generation unit 122 without receiving the transparent instruction signal TS.

According to the display device 20 of the present embodiment, it is possible to prevent from hindering the vision when displaying the main video for a long time, in the see-through type liquid crystal display device including the liquid crystal panel 111, the box-type cabinet 213, and the light source 114. As a variant of the present embodiment, as with the first embodiment, a field-sequential, see-through type liquid crystal display device can be constituted.

(Third Embodiment)

Figure 15:
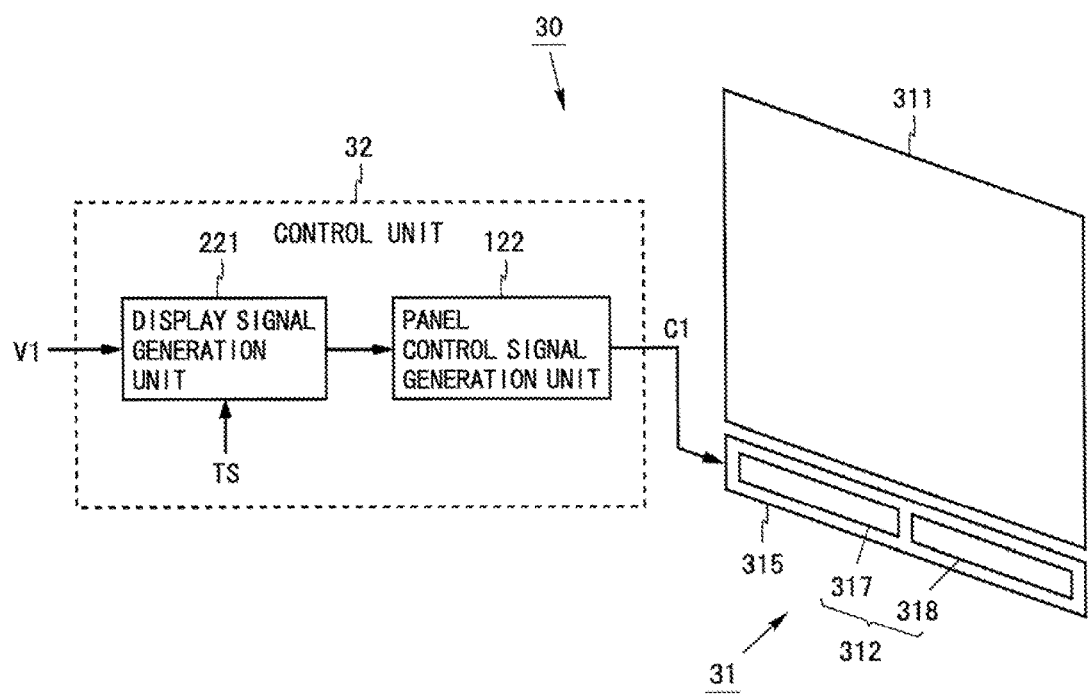
FIG. 15 is a block diagram showing a configuration of a display device according to a third embodiment of the present invention.

FIG. 15 is a block diagram showing a configuration of a display device according to a third embodiment of the present invention. A display device 30 shown in FIG. 10 is a see-through type organic EL display device including a display unit 31 and a control unit 32. The display unit 31 includes a transparent organic EL panel 311 and a panel drive circuit 312. The control unit 32 includes the display signal generation unit 221, and the panel control signal generation unit 122.

As with the liquid crystal panel 111, the transparent organic EL panel 311 includes m scanning lines G1 to Gm, n data lines S1 to Sn, and (m×n) pixels P (refer to FIG. 2). The pixel P includes an organic EL element, one or more transistors, and a transparent pixel electrode (none of them are shown). The pixel P functions one of a red sub-pixel, a green sub-pixel, and a blue sub-pixel in accordance with a light emitting color of the organic EL element. The (m×n) pixels P function as (m×n/3) color pixels.

The panel drive circuit 312 is provided on a panel drive substrate 315. The panel drive substrate 315 is placed so as not to overlap with the transparent organic EL panel 311. In FIG. 15, the panel drive substrate 315 is placed along a lower side of the transparent organic EL panel 311. A scanning line drive circuit 317 and a data line drive circuit 318 are provided on the panel drive substrate 315 as the panel drive circuit 312. Operations of the scanning line drive circuit 317 and the data line drive circuit 318 are similar to those of the first embodiment.

The organic EL element emits light at brightness in accordance with the video signal included in the panel control signal C1. When the organic. EL element turns on, the pixel P is normally opaque. When the organic EL element does not emit light or emits light at low brightness, the pixel P is transparent. Therefore, the space behind the transparent organic EL panel 311 (space behind the display screen) can be seen transparently through the pixel P having low brightness.

The control unit 32 is obtained by deleting the light source drive signal generation unit 223 from the control unit 22 according to the second embodiment. The control unit 32 controls the display unit 31 to display the transparent video while displaying the main video based on the input video signal V1. In the present embodiment, the video signal of the transparent portion included in the transparent video is set to a signal corresponding to the minimum brightness, for example.

As with the second embodiment, first to fourth configuration examples can be considered for the control unit 32. The control units 32 of the first to fourth configuration examples are obtained by deleting the light source drive signal generation unit 223 from the control units 22a to 22d shown in FIGS. 11 to 14. Since the operations of the control unit 32 are similar to those of the second embodiment, their descriptions are omitted here.

According to the display device 30 of the present embodiment, it is possible to prevent from hindering the vision when displaying the main video for a long time, in the see-through type organic EL display device having the transparent organic EL panel 311.

(Fourth Embodiment)

Figure 16:
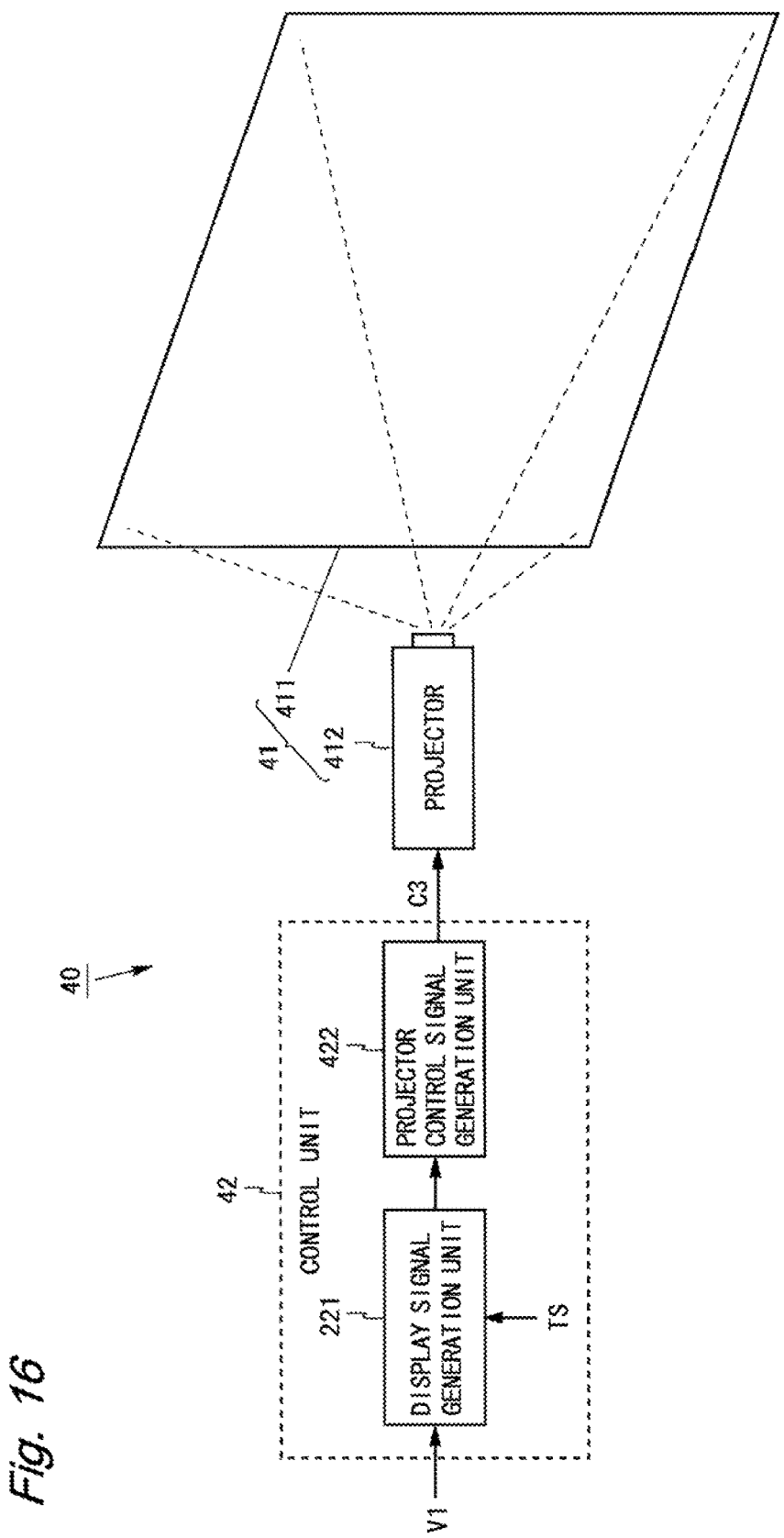
FIG. 16 is a block diagram showing a configuration of a display device according to a fourth embodiment of the present invention.

FIG. 16 is a block diagram showing a configuration of a display device according to a fourth embodiment of the present invention. A display device 40 shown in FIG. 16 is a see-through type projection display device including a display unit 41 and a control unit 42. The display unit 41 includes a transparent screen 411 and a projector 412. The control unit 42 includes the display signal generation unit 221 and a projector control signal generation unit 422.

The transparent screen 411 is a screen formed of a transparent material. When the transparent screen 411 is irradiated with light, the light reflects at the transparent screen 411. Thus, a portion irradiated with the light is opaque. A portion not irradiated with the light and a portion irradiated with a dark light are transparent. Therefore, the space behind the transparent screen 411 (space behind the display screen) can be seen transparently through a dark portion of the transparent screen 411.

The projector 412 is a projector of an arbitrary type. For example, the projector 412 may be a liquid crystal projector having a transparent type liquid crystal panel, a DLP (Digital Light Processing, registered trademark) projector having a DMD (Digital Mirror Device, registered trademark) device, or a LCOS (Liquid Crystal On Silicon, registered trademark) projector having a reflective type liquid crystal panel.

The control unit 42 is obtained by replacing the panel control signal generation unit 122 of the control unit 32 according to the third embodiment with the projector control signal generation unit 422. The projector control signal generation unit 422 outputs a projector control signal C3 to the projector 412. The projector 412 projects a video corresponding to the video signal included in the projector control signal C3 on the transparent screen 411 based on the projector control signal C3. A portion having low brightness included in the video projected by the projector 412 is transparent on the transparent screen 411. In this embodiment, the video signal of the transparent portion included in the transparent video is set to a signal corresponding to the minimum brightness, for example.

As with the second and third embodiments, first to fourth configuration examples can be considered for the control unit 42. The control units 42 of the first to fourth configuration examples are obtained based on the control units 22a to 22d shown in FIGS. 11 to 14 by deleting the light source drive signal generation unit 223 and replacing the panel control signal generation unit 122 with the projector control signal generation unit 422. Since operations of the control unit 42 are similar to those of the second embodiment, their descriptions are omitted here.

According to the present embodiment, it is possible to prevent from hindering the vision when displaying the main video for a long time, in the see-through type projection display device having the transparent screen 411 and the projector 412.

As described above, the display device of the present invention displays the transparent video while displaying the main video based on the input video signal. According to the display device of the present invention, it is possible to show the space behind the display screen transparently and prevent from hindering the vision, by displaying the transparent video in the middle of displaying the main video for a long time.

INDUSTRIAL APPLICABILITY

Since the display device of the present invention has a feature that the device does not hinder the vision when displaying the main video a long time, the device can be used for plural kinds of display devices, such as a liquid crystal display device, an organic EL display device, or a projection display device.

DESCRIPTION OF REFERENCE CHARACTERS 10, 20, 30, 40: DISPLAY DEVICE
11, 21, 31, 41: DISPLAY UNIT
12, 22, 32, 42: CONTROL UNIT
111: LIQUID CRYSTAL PANEL
112, 312: PANEL DRIVE CIRCUIT
113: TRANSPARENT LIGHT GUIDE PLATE
114: LIGHT SOURCE
121, 221: DISPLAY SIGNAL GENERATION UNIT
122: PANEL CONTROL SIGNAL GENERATION UNIT
123, 223: LIGHT SOURCE DRIVE SIGNAL GENERATION UNIT
124: TRANSPARENT INSTRUCTION SIGNAL GENERATION UNIT
213: BOX-TYPE CABINET
311: TRANSPARENT ORGANIC EL PANEL
411: TRANSPARENT SCREEN
412: PROJECTOR
422: PROJECTOR CONTROL SIGNAL GENERATION UNIT
TS: TRANSPARENT INSTRUCTION SIGNAL

The invention claimed is:

1. A display device comprising:
a display unit having a function of showing a space behind a display screen transparently; and
a control unit configured to control the display unit based on an input video signal, wherein
the control unit is configured to control the display unit to display a transparent video based on a video signal different from the input video signal, have a first display period and a second display period set alternately, output the input video signal to the display unit in the first display period, and output, to the display unit in the second display period, a second video signal for displaying a transparent video having a transparent portion through which the space behind the display screen can be seen transparently, while displaying a main video based on the input video signal and
the display unit is configured to alternately perform displaying of a main video based on the input video signal in the first display period and displaying of the transparent video based on the second video signal in the second display period.

2. The display device according to claim 1, wherein the control unit includes an instruction signal generation unit configured to generate an instruction signal indicating the second display period of the transparent video, and is configured to control the display unit in accordance with the generated instruction signal.

3. The display device according to claim 1, wherein the control unit is configured to control the display unit in accordance with an instruction signal provided externally and indicating the second display period.

4. The display device according to claim 1, wherein the transparent video consists of images, each of which has the transparent portion at least mostly.

5. The display device according to claim 4, wherein the second video signal of the transparent portion is a signal corresponding to a maximum brightness or a minimum brightness.

6. The display device according to claim 1, wherein
the display unit includes a liquid crystal panel, a transparent light guide plate disposed in back of the liquid crystal panel, and a light source disposed on a side surface of the transparent light guide plate, and
the control unit is configured to turn on the light source in the first display period, and turn off the light source and output, as the second video signal to the display unit, a video signal having a high brightness portion as the transparent portion in the second display period.

7. The display device according to claim 1, wherein
the display unit includes a liquid crystal panel, a box-type cabinet disposed in back of the liquid crystal panel, and a light source configured to irradiate an inside of the box-type cabinet with light, and
the control unit is configured to output, as the second video signal to the display unit, a video signal including a high brightness portion as the transparent portion in the second display period.

8. The display device according to claim 6, wherein the display unit is configured to perform color display by field-sequential drive.

9. The display device according to claim 1, wherein
the display unit includes an organic electro-luminescence panel having a transparent pixel electrode, and
the control unit is configured to output, as the second video signal to the display unit, a video signal including a low brightness portion as the transparent portion in the second display period.

10. The display device according to claim 1, wherein
the display unit includes a transparent projector screen and a projector configured to project a video on the transparent projector screen, and
the control unit is configured to output, as the second video signal to the display unit, a video signal including a low brightness portion as the transparent portion in the second display period.

11. A method for controlling a display device including a display unit having a function of showing a space behind a display screen transparently, the method comprising the steps of:
setting a first display period and a second display period alternately;
outputting an input video signal to the display unit in the first display period; and
outputting, to the display unit in the second display period, a second video signal for displaying a transparent video having a transparent portion through which the space behind the display screen can be seen transparently, wherein
the display unit alternately performs displaying of a main video based on the input video signal in the first display period and displaying of the transparent video based on the second video signal in the second display period.

12. The display device according to claim 7, wherein the display unit is configured to perform color display by field-sequential drive.

* * * * *